3,753,970
CYCLOPEPTIDES DERIVED FROM POLYMYXINS AND THEIR PREPARATION
Jean Bouchaudon, Morsang-sur-Orge, Essonne, and Georges Jolles, Sceaux, Hauts-de-Seine, France, assignors to Rhone-Poulenc S.A., Paris, France
No Drawing. Filed Aug. 4, 1970, Ser. No. 60,944
Int. Cl. C07c *103/52;* C07g *7/00;* C08h *1/00*
U.S. Cl. 260—112.5          5 Claims

ABSTRACT OF THE DISCLOSURE

The new cyclopeptides of the formula:

$$(\alpha)\text{Dab-Dab-Y-Z-Dab-Dab-Thr} \atop (\gamma) \quad | \quad\quad | \quad | \atop \quad\quad G(\gamma) \quad\quad G(\gamma)\ G(\gamma)$$

in which Y—Z represents an amino acid chain selected from D-Leu-Thr, D-Phe-Leu, D-Leu-Leu and D-Leu-Ileu, G represents an amino-protecting radical of the formula:

$$\text{Py-CH-O-CO-} \atop | \atop R$$

in which Py represents pyridyl, pyridyl-N-oxide, or pyridyl or pyridyl-N-oxide carrying a methyl substituent, R represents hydrogen, alkyl of 1 to through 5 carbon atoms, or phenyl, and Dab represents α,γ-diaminobutyric acid, the amino acids having the L-configuration unless otherwise indicated, said cyclopeptides containing only a single free amino group, are useful intermediates for the synthesis of semi-synthetic products derived from polymyxins.

---

This invention relates to the cyclic polypeptides derived from polymyxins of the general formula:

$$(\alpha)\quad\quad \text{Dab-Dab-Y-Z-Dab-Dab-Thr} \atop (\gamma) \quad\quad\quad | \quad\quad\quad | \quad | \atop \quad\quad\quad\quad G(\gamma) \quad\quad\quad G(\gamma)\ G(\gamma)$$

(I)

and a process for their preparation.

In General Formula I the various symbols have the following meanings:

Y—Z represents one of the amino acid chains D-Leu-Thr, D-Phe-Leu, D-Leu-Leu and D-Leu-Ileu, and G represents a radical of the general formula:

$$\text{Py-CH-O-CO-} \atop | \atop R$$

(II)

in which the symbol Py represents a pyridyl or pyridyl-N-oxide radical unsubstituted or substituted by a methyl radical, and R represents a hydrogen atom, a straight- or branched-chain alkyl radical containing 1 to 5 carbon atoms, or a phenyl radical.

In this specification the abbreviations used to denote the amino acids are those of the International Union of Pure and Applied Chemistry, and the symbol Dab represents α,γ-diaminobutyric acid, it also being understood that, unless otherwise indicated, the amino acids have the L configuration.

The cyclic peptides of General Formula I are new products and useful intermediates in the synthesis of semi-synthetic products derived from the polymyxins by modification of the side chain possessing a good anti-microbial activity, especially against Gram-negative organisms such as *Escherichia coli* and *Pseudomonas aeruginosa*, and have a reduced toxicity as compared to that of the polymyxins isolated hitherto from mixtures obtained by fermentation.

The cyclic peptides of General Formula I in effect make it possible to obtain semi-synthetic polymyxins because they contain only a single free amino group which can be substituted by the usual methods of peptide chemistry.

It is known that the polymyxins obtained by fermentation are of various types usually designated by the letters A, B, D, E and M and that these polymyxins can be represented by the general formula $$\text{K-Dab-Thr-X-Dab-Dab-Y-Z-Dab-Dab-Thr}$$

(III)

in which K represents the n-octanoyl, L-6-methyloctanoyl or 6-methylheptanoyl radical, and at the same time Y—Z represents D-Leu-Thr and X represents D-Dab or D-Ser, or at the same time Y—Z represents D-Phe-Leu or D-Leu-Leu and X represents Dab, or K represents the L-6-methyloctanoyl or 6-methylheptanoyl radical and at the same time Y—Z represents D-Leu-Ileu and X represents Dab.

It is also known that the side chain of the polymyxins can be removed by selective splitting of the peptide bond connecting the said chain to the polypeptide ring without breaking the peptide bonds of this ring. Such splitting has been achieved enzymatically in the case of polymyxin E by Suzuki et al., J. Biochem. (Japan), 54, 412 (1963). However, the products obtained by such splitting of the peptide bond between the side chain and the polypeptide ring cannot be used in the preparation of semi-synthetic derivatives because they possess, in addition to the amino group liberated by the enzymatic action, a certain number of amino groups in the ring as a result of the presence of α,γ-diaminobutyric acid chain members in this ring; it is in effect impossible to cause the amino group liberated by enzymatic action to react selectively.

According to a feature of the present invention, the amino groups of the polypeptide ring of the polymyxins of General Formula III are blocked by means of the protective groups of General Formula II. The protective groups of Formula II not only have the advantage that they can be attached in good yields to the amino groups to be protected, but also enable polymyxins to be obtained in which the initially free amino groups are blocked and the blocked polymyxins are soluble in aqueous media, which makes it possible to subject them to enzymatic reactions under such conditions of pH, temperature and time that the activity of the enzymes used leads to the specific splitting of the peptide bond between the side chain and the polypeptide ring of the polymyxins without the ring being affected. Furthermore, such protective groups can subsequently be easily removed without splitting the polypeptide ring, for example by hydrogenolysis. Finally, such protective groups do not interfere with the action of the enzyme, despite the modifications which they cause in the ring.

According to the invention, the products of General Formula I are obtained from products of the general formula:

$$\text{K-Dab-Thr-X-Dab-Dab-Y-Z-Dab-Dab-Thr} \atop \quad\quad\quad\ \ G(\gamma) \quad\quad\quad\quad\ G(\gamma) \quad\quad G(\gamma)\ G(\gamma)$$

(IV)

in which the symbols G, K, X and Y—Z are as hereinbefore defined, with the amino acid represented by the symbol X when α,γ-diaminobutyric acid optionally carrying a group G as hereinbefore defined on the γ-amino group, by selective hydrolysis of the peptide bond linking the linear side chain to the polypeptide ring. This hydrolysis is carried out enzymatically under suitable conditions of time, temperature and pH.

Different proteolytic enzymes are capable of bringing about this selective hydrolysis, especially the exocellular proteases elaborated by various strains of *Bacillus subtilis* such as subtilisine, nagarse, pronase, colistinase and alcalase, or the proteases elaborated by *Bacillus subtilis* Glaxo 417, *Bacillus subtilis* A.T.C.C. 9524 or *Bacillus subtilis* THE 4.

Depending on the enzymes used, it is advantageous to carry out the process at temperatures between 20° and 70° C., in an aqueous medium buffered to a pH of between 5 and 9.

The products of General Formula IV in which the symbols G, K, X and Y—Z are defined as above can be obtained from the polymyxins of General Formula III by carrying out the methods usually employed in peptide chemistry for blocking amino groups. It is particularly advantageous to react the polymyxin with a mixed carbonate of the general formula:

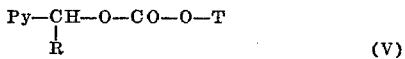
(V)

in which the symbols Py and R are as hereinbefore defined and T represents a phenyl radical or a substituted phenyl radical, for example p-nitrophenyl or 2,4,5 - trichlorophenyl, or a radical derived from a heterocyclic compound, for example the 8-quinolinyl or 2,5-dioxopyrrolidin-1-yl radical. The reaction is advantageously carried out in an organic solvent such as dimethylformamide at a temperature between 15° and 60° C.

The mixed carbonates of General Formula V can be prepared by reaction of a chloroformate of the general formula:

 (VI)

in which T is as hereinbefore defined, with an alcohol of the general formula:

(VII)

in which Py and R are as hereinbefore defined. This reaction is advantageously effected in pyridine at about 0° C. or in a mixture of pyridine-methylene chloride at a temperature of between 0° and 20° C.

The peptides of General Formula IV, the mixed carbonates of General Formula V and the alcohols of General Formula VII in which the symbol Py represents a pyridyl-N-oxide radical can be obtained from the corresponding non-oxidised products by the action of an appropriate oxidising agent such as p-nitroperbenzoic acid. The oxidation is generally carried out in inert organic solvent such as an alcohol, e.g. methanol, a chlorinated hydrocarbon, e.g. chloroform, or an ester, e.g. ethyl acetate, at a temperature of between 0° and 25° C.

The products of General Formula I can optionally be purified by physical methods such as recrystallisation, chromatography or counter-current distribution, or by chemical methods such as conversion into addition salts followed by recrystallisation of these from an appropriate solvent, and their decomposition in an alkaline medium. In such chemical methods the nature of the anion of the salt is immaterial.

The following examples illustrate the invention. The melting points indicated therein were measured on a Kofler hot bench.

EXAMPLE 1 p-Nitrophenyl chloroformate (201.54 g.) was added in small portions, over the course of about 1¼ hours, to a solution of 3-hydroxymethylpyridine (109.1 g.) in pyridine (500 cc.) cooled to 0° C. The reaction mixture was stirred for 1 hour at 0° C.; the temperature was allowed to return to 20° C., and stirring continued for a further 16 hours at this temperature. Methylene chloride (1.6 litres) was added, and the mixture was washed with distilled water (3× 500 cc.) and then with a saturated sodium chloride solution (500 cc.). The organic solution was dried over sodium sulphate and then concentrated to dryness under reduced presure (20 mm. Hg) at 50° C. The resulting oil was dissolved in ethanol (1.6 litres) and the solution left to stand for 16 hours at 0° C. The resulting precipitate was filtered off, washed with ethanol (100 c.) and dried under reduced pressure (0.3 mm. Hg) to yield 3-pyridylmethyl p-nitrophenyl carbonate (128 g., M.P. 93° C. inst.).

$R_f=0.73$ [silica gel; methanol-1,2-dichloroethane (2–8 by volume)].

*Analysis.*—Calculated (percent): C, 56.94; H, 3.67; N, 10.21. Found (percent): C, 57.58; H, 3.86; N, 9.89.

EXAMPLE 2

3-pyridylmethyl p-nitrophenyl carbonate (16.5 g.) was added to a solution of colistine (3.51 g.) in dimethylformamide (140 cc.). After 48 hours stirring at about 20° C., the insoluble matter was filtered off and the filtrate concentrated to dryness under reduced pressure (0.3 mm. Hg) at 55° C. The glassy residue was dissolved in boiling nitromethane (180 cc.); a small quantity of insoluble matter was filtered off. The filtrate was thereafter kept at 0° C. for 2½ hours after which the precipitate which formed was filtered off, washed with ice-cold nitromethane (10 cc.) and then dried under reduced pressure (0.3 mm. Hg) at 50° C. for 16 hours. Penta-N-(3-pyridylmethoxycarbonyl)colistine (3.85 g.) was thus obtained.

$R_f=0.74$ [silica gel; n-butanol-pyridine-acetic acid water (50-20-6-24 by volume)].

*Analysis.*—Calculated (percent): C, 57.28; H, 6.82; N, 15.94. Found (percent): C, 57.70; H, 6.67; N, 15.78.

EXAMPLE 3 p-Nitroperbenzoic acid (1.3 g.) was added to a solution of penta-N-pyridylmethoxycarbonyl)colistine (1.3 g.) in methanol (150 cc.). The reaction mixture was stirred at about 20° C. for 16 hours and then concentrated to dryness under reduced pressure (20 mm. Hg) at 50° C. The solid residue was washed with acetone (3× 20 cc.) at 20° C. and then with acetone (3× 20 cc.) at 50° C.

After drying under reduced pressure (0.3 mm. Hg) at 20° C., penta-N-[(3-pyridyl-N-oxide)methoxycarbonyl] colistine (959 mg.) was obtained.

$R_f=0.32$ [silica gel; n-butanol-pyridine-acetic acid-water (50-20-6-24 by volume)].

EXAMPLE 4 p-Nitroperbenzoic acid (21.96 g.) was added to a solution of 3-hydroxymethylpyridine (10.9 g.) in ethyl acetate (200 cc.) cooled to 0° C. After 15 minutes stirring at 0° C. followed by gradual return of the reaction mixture to a temperature of about 20° C., the resulting precipitate was filtered off, washed with ethyl acetate (100 cc.) and dried under reduced pressure (0.3 mm. Hg) at about 20° C. The product obtained was then suspended in distilled water (200 cc.); Amberlite IRA 402 resin (90 cc.) in the carbonate form was added to the suspension, and the mixture was stirred for 25 minutes at about 20° C. The resin was filtered off and washed with distilled water (2× 100 cc.). The filtrate and the washing liquors were combined and concentrated to dryness under reduced pressure (20 mm. Hg) at 55° C. The resulting oil was dissolved in boiling ethyl acetate (80 cc.). After gradual cooling to 20° C. and maintenance of this temperature for 15 minutes, the precipitate formed was filtered off and washed with ethyl acetate (50 cc.).

Drying under reduced pressure (0.3 mm. Hg) at 20° C. gave 3-hydroxymethylpyridine-N-oxide (11.6 g., M.P. 90° C. inst.).

*Analysis.*—Calculated (percent): N→O, 23.98. Found (percent): N→O, 23.70.

EXAMPLE 5 p-Nitrophenyl chloroformate (1.61 g.) was added in small portions over the course of 30 minutes to a solution of 3-hydroxymethylpyridine-N-oxide (1 g.) in pyridine (14 cc.) cooled to 0° C. The reaction mixture was stirred for 17 hours at about 20° C. The precipitate formed was filtered off, washed with pyridine 2× 4 cc.) and dried under reduced pressure (0.3 mm. Hg) at 20°

C. giving (3-pyridyl-N-oxide)methyl p-nitrophenyl carbonate (1.2 g., M.P. 160° C. inst.).

EXAMPLE 6 p-Nitroperbenzoic acid (12.1 g.) was added to a solution of 3-pyridylmethyl p-nitrophenyl carbonate (15.1 g.) in chloroform (400 cc.). After 16 hours stirring at 20° C., the precipitate formed was filtered off and washed with chloroform (2× 100 cc.). The filtrate and the wash liquors were combined and concentrated to dryness under reduced pressure (17 mm. Hg) at 30° C.

The solid residue was suspended in diethyl ether (600 cc.) and the suspension vigorously stirred for 10 minutes. The insoluble matter was filtered off and again suspended in diethyl ether (600 cc.); after 10 minutes stirring the insoluble matter was filtered off, washed with diethyl ether (100 cc.) and dried under reduced pressure (0.3 mm. Hg) at 20° C. to give (3-pyridyl-N-oxide) methyl p-nitrophenyl carbonate (14.9 g.).

$R_f$=0.4 [silica gel; methanol-1,2-dichloroethane (2–8 by volume)].

EXAMPLE 7

(3-pyridyl-N-oxide)methyl p-nitrophenyl carbonate (30 g.) was added to a suspension of colistine (12 g.) in dimethylformamide (900 cc.). After 64 hours stirring at 20° C., the insoluble matter was filtered off. The filtrate was concentrated to ⅔ of its volume under reduced pressure (0.3 mm. Hg) at 50° C.; diethyl ether (500 cc.) was added to the concentrate. An oil formed and was separated and dissolved in methanol (500 cc.). Diethyl ether (500 cc.) was added to the solution obtained. An oil separated out which then crystallised. After standing at 20° C. for 15 hours, the crystals were filtered off, washed with diethyl ether (100 cc.) and dried under reduced pressure (0.3 mm. Hg) at 20° C. Penta-N-[(3-pyridyl-N-oxide)methoxycarbonyl]colistine (16.8 g.) was thus obtained.

$R_f$=0.32 [silica gel; n-butanol-pyridine-acetic acid-water (50-20-6-24 by volume)].

Analysis.—Calculated (percent): N→O, 7.79. Found (percent): N→O, 7.60.

EXAMPLE 8

(3-pyridyl-N-oxide)methyl p-nitrophenyl carbonate (3.18 g.) was added to a suspension of polymyxin B (2.17 g.) in dimethylformamide (145 cc.). After 24 hours stirring at 60° C. and 65 hours stirring at 20° C., the insoluble matter was filtered off and the filtrate concentrated to dryness under reduced pressure (0.3 mm. Hg) at 60° C. The residue was dissolved in methanol (7 cc.) and the solution was cromatographed on a column of Sephadex LH 20 (300 g.) (column diameter: 38 mm.; height: 1.80 m.). The column was eluted with methanol, 7 cc. fractions being collected. Fractions 130 to 170 were combined and concentrated to dryness under reduced pressure (20 mm. Hg) at 50° C. yielding penta-N-[(3 - pyridyl - N - oxide)methoxycarbonyl]polymyxin B (3.2 g.).

$R_f$=0.30 [silica gel; n - butanol - pyridine - acetic acid-water (50-20-6-24 by volume)].

EXAMPLE 9

A solution of 2,4,5-trichlorophenyl chloroformate (13 g.) in methylene chloride (20 cc.) was added dropwise over 20 minutes to a solution of 3-hydroxymethylpyridine (5.45 g.) in a mixture of pyridine (3.95 g.) and methylene chloride (45 cc.) whilst maintaining the temperature of the reaction mixture below 35° C. Some minutes after the end of the addition of the chloroformate, a yellow precipitate appeared. The reaction mixture was stirred for 20 hours at 20° C. Distilled water (20 cc.) was then added and the precipitate dissolved. The organic phase was separated and washed with distilled water (2× 25 cc.), a 5% (weight/volume) aqueous sodium bicarbonate solution (25 cc.) and saturated aqueous sodium chloride solution (25 cc.). The organic solution was dried over sodium sulphate and concentrated to dryness under reduced pressure (20 mm. Hg) at 50° C. The solid residue obtained was dissolved in the minimum of boiling methanol (30 cc.) and the solution was left to stand for 1 hour at 20° C. The precipitate which appeared was filtered off, washed with methanol (30 cc.) and dried under reduced pressure (0.3 mm. Hg) at 20° C. yielding 3-pyridylmethyl 2,4,5-trichlorophenyl carbonate (7.8 g., M.P. 95° C. inst.).

Analysis.—Calculated (percent): C, 46.95; H, 2.42; N, 4.21; Cl, 31.98. Found (percent): C, 47.69; H, 2.8; N, 4.11; Cl, 31.41.

EXAMPLE 10 p-Nitroperbenzoic acid (3.3 g.) was added to a solution of 3-pyridylmethyl 2,4,5-trichlorophenyl carbonate (5 g.) (prepared as described in Example 9) in chloroform (80 cc.). After 16 hours stirring at 20° C., the precipitate formed was filtered off and washed with chloroform (20 cc.). The combined organic solutions were concentrated to 50 cc. under reduced pressure (13 mm. Hg) at 50° C. and the concentrate was stirred for 10 minutes with a 15% (weight/volume) aqueous solution of sodium carbonate. The aqueous phase was separated and washed with chloroform (20 cc.); the organic phases were combined and successively washed with a 15% (weight/volume) aqueous sodium carbonate solution (20 cc.), distilled water (20 cc.) and saturated sodium chloride solution (20 cc.). The organic solution was then dried over sodium sulphate and concentrated to dryness under reduced pressure (13 mm. Hg) at 50° C. (3-pyridyl-N-oxide)methyl 2,4,5-trichlorophenyl carbonate (4.2 g., M.P. 169° C. inst.) was thus obtained. A sample recrystallised from methanol melted at 171° C. inst.

Analysis.—Calculated (percent): C, 44.79; H, 2.31; N, 4.02; Cl, 30.51. Found (percent): C, 44.9; H, 2.6; N, 3.75; Cl, 30.6.

EXAMPLE 11

(3-pyridyl-N-oxide)methyl 2,4,5-trichlorophenylcarbonate (2.1 g.) was added to a suspension of colistine (1.169 g.) in dimethylformamide (80 cc.). After 44 hours stirring at 50° C., the insoluble matter was filtered off. The filtrate was concentrated to dryness under reduced pressure (0.3 mm. Hg) at 60° C. Diethyl ether (60 cc.) was added to the oily residue obtained. A crystalline product appeared which was filtered off, washed with diethyl ether (20 cc.) and dried under reduced pressure (0.3 mm. Hg) at 20° C. Penta-N-[(3-pyridyl-N-oxide)methoxycarbonyl]-colistine (1.5 g.) was thus obtained, identical with the product of Example 7.

$R_f$=0.32 [silica gel; n-butanol-pyridine-acetic acid-water (50-20-6-24)].

Analysis.—Calculated (percent): C, 54.90; H, 6.54; N, 15.28. Found (percent): C, 55.31; H, 6.8; N, 14.90.

EXAMPLE 12

A solution of p-nitrophenyl chloroformate (8.06 g.) in methylene chloride (40 cc.) was added dropwise to 4-hydroxymethylpyridine (4.36 g.) in a mixture of pyridine (3.16 g.) and methylene chloride (35 cc.) maintained at 0° C. After the end of the addition, the reaction mixture was stirred for 18 hours at 0° C. and then washed successively with water (2× 20 cc.), a 5% (weight/volume) aqueous solution of sodium bicarbonate (2× 20 cc.) and an aqueous saturated sodium chloride solution (2× 20 cc.). The organic solution was concentrated to dryness under reduced pressure (15 mm. Hg) at 30° C., and the resulting residual oil was taken up in diethyl ether (600 cc.); the insoluble material was filtered off. After concentration of the filtrate to dryness under reduced pressure (30 mm. Hg) at 20° C., 4-pyridylmethyl p-nitrophenyl carbonate (4.1 g., M.P. 83° C. inst.) was obtained.

$R_f=0.61$ [silica gel; methanol-1,2-dichloroethane (5–95 by volume)].

By a similar procedure, starting from 2-hydroxymethyl-6-methylpyridine (2.46 g.) and p-nitrophenyl chloroformate (4.03 g.), (6-methyl-2-pyridyl)methyl p-nitrophenyl carbonate (1.30 g.) was obtained.

$R_f=0.83$ [silica gel; butyl methyl ketone-acetone-acetic acid-pyridine-cyclohexane (5–15–5–10–15 by volume)].

EXAMPLE 13

(6-methyl-2-pyridyl)methyl p-nitrophenyl carbonate (450 mg.) was added to a suspension of colistine (280 mg.) in dimethylformamide (15 cc.). After stirring for 64 hours at 20° C., the solution was concentrated to dryness under reduced pressure (0.3 mm. Hg) at 55° C. Diethyl ether (10 cc.) was added to the glassy residue, and the crystals which appeared were filtered off and washed with diethyl ether (3× 20 cc.). Ponta-N-[(6-methyl-2-pyridyl)-methoxycarbonyl]colistine (92 mg.) was thus obtained.

$R_f=0.91$ [silica gel; n-butanol-pyridine-acetic acid-water (50–20–6–24 by volume)].

EXAMPLE 14

(6-methyl-2-pyridyl-N-oxide)methyl p-nitrophenyl carbonate (400 mg.) was added to a suspension of colistine (200 mg.) in dimethylformamide (10 cc.). After 48 hours stirring at 20° C., the solution was concentrated to dryness under reduced pressure (0.3 mm. Hg) at 50° C. The glassy residue crystallised on addition of diethyl ether (10 cc.). The crystals were filtered off and then washed with diethyl ether (2× 3 cc.).

After drying under reduced pressure (0.3 mm. Hg) at 20° C., penta-N-[(6-methyl-2-pyridyl - N - oxide)methoxycarbonyl]colistine (220 mg.) was obtained.

$R_f=0.53$ [silica gel; n-butanol-pyridine-acetic acid-water (50–20–6–24 by volume)].

EXAMPLE 15

4-pyridylmethyl p-nitrophenyl carbonate (900 mg.) was added to a suspension of colistine (400 mg.) in dimethylformamide (25 cc.). After stirring for 64 hours at 20° C., the solution was concentrated to dryness under reduced pressure (0.3 mm. Hg) at 55° C. Diethyl ether (20 cc.) was added to the glassy residue, and the crystals which appeared were filtered off, washed with diethyl ether (3× 20 cc.) and dried under reduced pressure (0.3 mm. Hg) at 20° C. to give penta-N-(4-pyridylmethoxycarbonyl) colistine (620 mg.).

$R_f=0.74$ [silica gel; n-butanol-pyridine-acetic acid-water (50–20–6–24 by volume)].

EXAMPLE 16 p-Nitrophenyl chloroformate (2.02 g.) was added to a solution of 4-hydroxymethylpyridine-N-oxide (1.25 g.) in pyridine (20 cc.) cooled to 0° C. After the end of the addition, the reaction mixture was stirred for 17 hours at about 20° C. The precipitate formed was filtered off, washed with pyridine (2× 4 cc.) and dried under reduced pressure (0.3 mm. Hg) at 20° C. (4-pyridyl-N-oxide)methyl p-nitrophenyl carbonate (0.67 g.) was thus obtained.

*Analysis.*—Calculated (percent): C, 53.80; H, 3.47; N, 9.65. Found (percent): C, 52.90; H, 3.70; N, 9.68.

4-hydroxymethylpyridine-N-oxide (1.74 g., M.P. 125° C. inst.) was obtained by following the procedure of Example 4 but starting from 4-hydroxymethylpyridine (2.72 g.) and p-ntroperbenzoic acid (5.49 g.).

*Analysis.*—Calculated (percent): N→O, 12.8. Found (percent): N→O, 13.0.

EXAMPLE 17

(4 - pyridyl - N-oxide)methyl p-nitrophenyl carbonate (400 mg.) was added to a suspension of colistine (200 mg.) in dimethylformamide (10 cc.). After 64 hours stirring at 20° C., the solution was concentrated to dryness under reduced pressure (0.3 mm. Hg) at 55° C. Diethyl ether (10 cc.) was added to the glassy residue, and the crystals which appeared were filtered off, washed with diethyl ether (2× 3 cc.) and dried under reduced pressure (0.3 mm. Hg) at 20° C. Penta-N-[(4-pyridyl-N-oxide)-methoxycarbonyl]colistine (250 mg.) was thus obtained.

$R_f=0.29$ [silica gel; n-butanol-pyridine-acetic acid-water (50-20-6-24 by volume)].

EXAMPLE 18

Subtilisine (50 mg.) was added to a solution of penta-N - [(3 - pyridyl-N-oxide)methoxycarbonyl]colistine (1.5 g.) in a solution (230 cc.) buffered to pH 7.5 and heated to 37° C., and the reaction mixture was stirred at 37° C. for 15 minutes. Immediately afterwards, the reaction mixture was cooled to −70° C.

Lyophilisation of the solution thus obtained yielded a cream powder, which was dissolved in the heavy phase (10 cc.) of a solvent system of the following composition: n-butanol (800 cc.), pyridine (200 cc.), acetic acid (100 cc.) and water (900 cc.) This solution was subjected to a counter-current distribution in an apparatus with 60 tubes, each capable of containing 10 cc. of heavy phase and 10 cc. of light phase. At the end of the distribution, the contents of each tube were concentrated to dryness under reduced pressure (25 mm. Hg) at 60° C. The residues from tubes 25 to 31 were dissolved in water (total 20 cc.) and the solution thus obtained was lyophilised. Cyclo[Nγ - L - α,γ-diaminobutyryl-Nγ-(3-pyridyl-N - oxide)methoxycarbonyl - L-α,γ-diaminobutyryl-D-leucyl - L - leucyl - Nγ-(3-pyridyl-N-oxide)methoxycarbonyl - L - α,γ-diaminobutyryl-Nγ-(3-pyridyl-N-oxide) methoxycarbonyl - L - α,γ - diaminobutyryl - L-threonyl] (246 mg.) was thus obtained.

$R_f=0.27$ [silica gel; n-butanol-pyridine-acetic acid-water (50-20-6-20) by volume)].

After total hydrolysis, analysis on the Technicon automatic analyser indicated the presence of the following amino acids:

Dab=4.07 (theory=4)
Leu=2.00 (theory=2)
Thr=0.98 (theory=1).

By following an analogous procedure but replacing the subtilisine by nagarse, pronase, colistinase, alcalase or the proteases elaborated by *Bacillus subtilis* Glaxo 417, *Bacillus subtilis* A.T.C.C. 9524 and Bacillus THE 4, the polypeptide ring described above was also obtained, identified by chromatography on silica gel ($R_f=0.27$) in the system n-butanol-pyridine-acetic acid-water (50-20-6-24 by volume).

The solution, buffered to pH 7.5, used to dissolve the penta - N - [(3-pyridyl-N-oxide)methoxycarbonyl]colistine was obtained by adjusting the pH of a solution of acetic acid (34 cc.) in distilled water (700 cc.) to 7.5 (determined on a pH-meter) by adding 5 N ammonium hydroxide and subsequently making up to 1000 cc. by adding distilled water.

EXAMPLE 19

Alkaline protease elaborated by *Bacillus subtilis* (containing 9.5 U/mg., 500 mg.) was added to a solution of penta - N - [(3 - pyridyl-N-oxide)methoxycarbonyl]-colistine (5 g.) in a solution (1 litre) buffered to pH 6, and the reaction mixture was stirred at 21° C. for 3 hours. Immediately afterwards, the pH of the reaction mixture was adjusted to 3 by adding 1 N hydrochloric acid. Lyophilisation of the solution thus obtained yields a cream powder which was taken up in methanol (80 cc.). Insoluble matter was filtered off and the filtrate was then concentrated to dryness under reduced pressure (20 mm. Hg) at 50° C. The solid residue obtained (5.9 g.) was dissolved in an ethanol-methanol solution (75–25 by volume, 30 cc.) and the solution was chromatographed on a column of neutral alumina (320 g.) (column height: 70 cm.; diameter: 2.8 cm.). Elution was carried out successively with:

a mixture of ethanol-methanol (75–25 volume, 1, 1.);
a mixture of ethanol-methanol (50–50 by volume, 4.5 1.);
a mixture of ethanol-methanol (25–75 by volume, 3 1.), and methanol (3.5 1.), and 500 cc. fractions were collected. Fractions 10 to 21 were combined and concentrated to dryness under reduced pressure (20 mm. Hg) at 50° C. Cyclo[Nγ-L-α,γ-diaminobutyryl - Nγ - (3 - pyridyl-N-oxide)methoxycarbonyl-L-α,γ - diaminobutyryl - D - leucyl-L-leucyl-Nγ-(3-pyridyl-N - oxide)methoxycarbonyl - L - α,γ-diaminobutyryl-Nγ-(3 - pyridyl - N - oxide)methoxycarbonyl]-L-α,γ-diaminobutyryl-L-threonly] (1.55 g.) was thus obtained.

The solution, buffered to pH 6, used to dissolve the penta - N - [(3 - pyridyl - N - oxide)methoxycarbonyl] colistine was obtained by adjusting the pH of a solution of monopotassium phosphate (454 mg.) in distilled water (1 litre) to 6 (determined on the pH-meter) by adding a solution of disodium phosphate dodecahydrate (1.2 g.) in distilled water (1 litre).

The unit quantity of enzyme is the quantity of enzyme which, at pH 9.5 and at 50° C., liberates from casein in 1 minute sufficient peptide which is soluble in trichloracetic acid for an increase in optical density of 1.00 at 280 nm. to be observed. The strength of the enzyme (U/mg.) is thus the number of units per mg. of substance. This method of determination of enzymatic activity is similar to that described by M. Kunitz, J. Gen. Physiol., 30, 291 (1947).

EXAMPLE 20

Alkaline protease elaborated by *Bacillus subtilis* (containing 9.5 U/mg., 3 g.) was added to a solution of penta-N - [(3 - pyridyl - N-oxide)methoxycarbonyl]colistine (10 g.) in a solution buffered to pH 6 (2 litres), and the reaction mixture was stirred at 21° C. for 3 hours. Immediately afterwards, the pH of the reaction mixture was brought to 3 by adding 1 N hydrochloric acid and the insoluble matter was filtered off.

Lyophilisation of the solution thus obtained yielded a cream powder (14.6 g.) which was dissolved in distilled water (200 cc.); Dowex 1×2 (OH⁻) resin (200 cc.) was added to the solution. The mixture was stirred for 1 hour and filtered, the resin was washed with distilled water (600 cc.) and the aqueous phase lyophilised. A cream powder (8.5 g.) was obtained which was taken up in methanol (150 cc.). The mixture was stirred for ½ hour, after which the insoluble matter was filtered off and washed with methanol (3 × 50 cc.). The filtrate was concentrated to dryness under reduced pressure (20 mm. Hg) at 50° C. The solid residue obtained (8.1 g.) was dissolved in a methanol-dioxan solution (95–5 by volume, 20 cc.) and the solution was chromatographed on a column of silica (138 g.) (height of column: 75 cm.; diameter: 2.2 cm.). A methanol-dioxan mixture (95–5 by volume) was used for elution, and fractions of 50 cc. were collected. Fractions 22 to 60 were combined and concentrated to dryness under reduced pressure (20 mm. Hg) at 50° C. Cyclo - [Nγ-L-α,γ-diaminobutyryl-Nγ-(3-pyridyl - N - oxide)methoxycarbonyl - L - α,γ-diaminobutyryl-D-leucyl-L-leucyl - Nγ - (3-pyridyl-N-oxide)methoxycarbonyl-L-α,γ - diaminobutyryl - Nγ - (3-pyridyl-N-oxide)methoxycarbonyl - L - α,γ-diaminobutyryl-L-threonly] (3.25 g.) was thus obtained.

The solution, buffered to pH 6, used in this example to dissolve the colistine starting material was prepared as indicated in Example 19, and the definition of the strength of the enzyme is the same as that given in Example 19.

EXAMPLE 21

Alkaline protease elaborated by *Bacillus subtilis* (containing 9.5 U/mg., 1.02 g.) was added to a solution of penta - N - [(3-pyridyl-N-oxide)methoxycarbonyl]-polymyxin B (3.17 g.) in a solution (634 cc.) buffered to pH 6, and the reaction mixture was stirred at 22° C. for 3 hours. Immediately afterwards, the pH of the reaction mixture was adjusted to 3 by adding 1 N hydrochloric acid. The insoluble matter was filtered off and the filtrate concentrated to dryness under reduced pressure 20 mm. Hg) at 50° C. The cream powder obtained was dissolved in distilled water (60 cc.) and Amberlite IRA 400 (OH⁻ form) (60 cc.) was added to the solution. The mixture was stirred for 1 hour and filtered, the resin was washed with distilled water (200 cc.) and the aqueous phase lyophilised. The solid obtained was taken up in methanol (50 cc.), and the mixture stirred for ½ hour. The insoluble matter was filtered off and washed with methanol (3 × 15 cc.). The filtrate was concentrated to dryness under reduced pressure (20 mm. Hg) at 50° C. The solid residue obtained was dissolved in a methanol-dioxan solution (95–5 by volume, 5 cc.) and the solution chromatographed on a silica column (height: 70 cm.; diameter: 1.8 cm.). Elution was effected with a methanol-dioxan mixture (95–5 by volume), 25 cc. fractions being collected. Cyclo[Nγ - L - α,γ-diaminobutyryl-Nγ-(3-pyridyl-N-oxide)methoxycarbonyl - L - α,γ-diaminobutyryl-D-phenylalanyl - L - leucyl - Nγ - (3-pyridyl-N-oxide)methoxycarbonyl - L - α,γ-diaminobutyryl-Nγ-(3-pyridyl-N-oxide)-methoxycarbonyl - L - α,γ-diaminobutyryl-L-threonyl] was thus obtained.

Rf=0.27 [silica -gel; n-butanol-pyridine-acetic acid water (50-20-6-24 by volume)].

The solution, buffered to pH 6, used in this example to dissolve the polymyxin B starting material was prepared as indicated in Example 19, and the definition of the strength of the enzyme is the same as that given in Example 19.

EXAMPLE 22

Protease (12 mg.) elaborated by *Bacillus subtilis* THE 4 was added to a solution of penta-N-[(4-pyridyl-N-oxide)methoxycarbonyl]colistine (55 mg.) (prepared as described in Example 17) in a solution (12 cc.) buffered to pH 6 (prepared as described in Example 19), and the reaction mixture was stirred at 20° C. for 2 hours 30 minutes. Immediately afterwards, the reaction was stopped by adjusting the pH of the solution to 3 by adding 1 N hydrochloric acid. The reaction mixture, cooled to −70° C., was lyophilised. The solid residue obtained, dissolved in methanol (4 cc.), was chromatographed on a column containing silica gel (5 g.) in its lower part and alumina (5 g.) in its upper part (column diameter: 10 mm.; height: 30 cm.). Elution was effected with a methanol-dioxan mixture (95–5 by volume), fractions of 4 cc. being collected. Fractions 8 to 11 were combined and then concentrated to dryness under reduced pressure (15 mm. Hg) at 50° C.

Cyclo[Nγ - L - α,γ-diaminobutyryl-Nγ-(4-pyridyl-N-oxide)methoxycarbonyl -L - α,γ-diaminobutyryl-D-leucyl-L-leucyl - Nγ - (4-pyridyl-N-oxide)methoxycarbonyl-L-α,γ - diaminobutyryl - Nγ - (4-pyridyl-N-oxide)methoxycarbonyl - L - α,γ-diaminobutyryl-L-threonyl] (10 mg.) was thus obtained.

Rf=0.24 [silica gel; n-butanol-pyridine-acetic acid-water (50-20-6-24 by volume)].

The structure of the products of General Formula I at the same time as the effectiveness of the process, were demonstrated by synthesising polymyxins which were already known, and hitherto obtained by fermentation, from products of General Formula I.

For example, polymyxin $E_1$ also called colistine, was prepared by reaction of the product of General Formula I, in which the symbols Y and Z represent D-leucine and L-leucine respectively and the symbol G represents the (3 - pyridyl - N - oxide)methoxycarbonyl radical, with a product of the general formula:

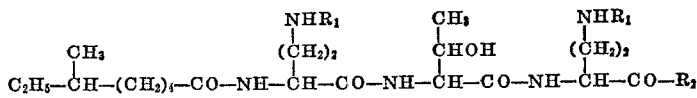

in which the symbol $R_1$ represents a protective group for amino groups, which is labile to hydrogenolysis, for example the benzyloxycarbonyl group or a group of General Formula II, and $R_2$ represents a group which activates the carbonyl group and is customary in peptide chemistry, such as the azido group, obtained from the corresponding hydrazide by the action of nitrous acid. After removing the protective groups, a product identical to polymyxin $E_1$ obtained by fermentation was obtained.

EXAMPLE 23

Sodium nitrite (6.2 mg.) dissolved in distilled water (0.1 cc.) was added to a solution of Nα-6-methyloctanoyl-Nγ - benzyloxycarbonyl - L - α,γ - diaminobutyryl - L-threonyl - Nγ - benzyloxycarbonyl - L - α,γ - diaminobutyrylhydrazide (63 mg.) [prepared according to the method of K. Vogler et al., Helv. Chim. Acta 48, 1161 (1965)] in a mixture of acetic acid (1.6 cc.) and 1 N hydrochloric acid (0.178 cc.) at 0° C. After 20 minutes stirring at 0° C., the reaction mixture was poured into ice-cold distilled water (20 cc.). The white precipitate which appeared was filtered off at 0° C. and washed with ice-cold distilled water (20 cc.). This precipitate was added to an ice-cold solution of cyclo-[Nγ - L - α,γ - diaminobutyryl - Nγ - (3 - pyridyl - N - oxide)methoxycarbonyl - L - α,γ - diaminobutyryl - D - leucyl-L-leucyl-Nγ - (3 - pyridyl - N - oxide)methoxycarbonyl - L - α,γ-diaminobutyryl - Nγ - (3 - pyridyl - N - oxide)methoxycarbonyl - L - α,γ-diaminobutyryl-L-threonyl] (100 mg.) (prepared as described in Example 18) in dimethylformamide (5 cc.). After standing for 20 hours at 2° C. the reaction mixture was concentrated to dryness under reduced pressure (0.3 mm. Hg) at 60° C. The resulting oil was taken up in diethyl ether (20 cc.). The precipitate which formed was filtered off and washed with water (2× 10 cc.).

After drying under reduced pressure (0.3 mm. Hg) at 20° C., cyclo [Nα - (Nα - 6 - methyloctanoyl - Nγ-benzyloxycarbonyl - L - α,γ - diaminobutyryl - L - threonyl - Nγ - benzyloxycarbonyl - L - α,γ-diaminobutyryl) - Nγ - L - α,γ - diaminobutyryl - Nγ-(3-pyridyl-N - oxide)methoxycarbonyl - L - α,γ - diaminobutyryl-D-leucyl - L - leucyl - Nγ - (3 - pyridyl - N - oxide)methoxycarbonyl - L - α,γ - diaminobutyryl - Nγ - (3 - pyridyl-N - oxide)methoxycarbonyl - L - α,γ - diaminobutyryl-L-threonyl] (106 mg.) was obtained.

$R_f$=0.51 [silica gel; n-butanol-pyridine-acetic acid-water (50-20-6-24 by volume)].

EXAMPLE 24

Palladium on charcoal (3.15% of Pd) (100 mg.) was added to a solution of cyclo [Nα - (Nα - 6 - methyloctanoyl - Nγ - benzyloxycarbonyl - L - α,γ - diaminobutyryl - L - threonyl - Nγ - benzyloxycarbonyl - L - α,γ-diaminobutyryl) - Nγ - L - α,γ - diaminobutyryl - Nγ-(3 - pyridyl - N - oxide)methoxycarbonyl - L - α,γ-diaminobutyryl - D - leucyl - L - leucyl - N γ - (3 - pyridyl-N - oxide)methoxycarbonyl - L - α,γ - diaminobutyryl-Nγ - (3 - pyridyl - N - oxide)methoxycarbonyl - L - α,γ-diaminobutyryl - L - threonyl] (90 mg.) in methanol (7 cc.) and 1 N hydrochloric acid (1 cc.), and a slight stream of hydrogen was passed through for 16 hours. After filtering and concentrating the filtrate to dryness under reduced pressure (25 mm. Hg) at 50° C., the solid residue obtained was dissolved in methanol (1 cc.) and the solution chromatographed on a column of Sephadex LH 20 (40 g.) (column diameter 14 mm., column height 1.7 m.).

Elution was effected with methanol, 3 cc. fractions being collected. Fractions 33 to 35 were combined and diluted with distilled water (10 cc.) and the resulting solution lyophilised. Colistine pentahydrochloride (32 mg.) was thus obtained.

$R_f$=0.29 [silica gel; n-butanol-pyridine-acetic acid-water (50-20-6-24 by volume)].

The colistine regenerated in this way was identical to natural colistine.

We claim:

1. Cyclopeptides of the formula:

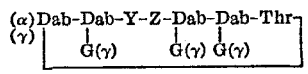

in which Y—Z represents an amino acid chain selected from D-Leucine-Threonine, D-Phenylalanine-Leucine, D-Leucine-Leucine and L-Leucine-Isoleucine, G represents a radical of the formula:

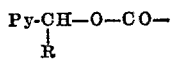

in which Py represents pyridyl, pyridyl-N-oxide, or pyridyl or pyridyl-N-oxide carrying a methyl substituent, R represents hydrogen, alkyl or 1 through 5 carbon atoms, or phenyl, Thr represents Threonine, and Dab represents α,γ-diaminobutyric acid, the amino acids having the L-configuration unless otherwise indicated."

2. Cyclopeptides according to claim 1 in which R represents hydrogen.

3. The cyclopeptide according to claim 1 which is cyclo[Nγ - L - α,γ - diaminobutyryl - Nγ - (3 - pyridyl-N - oxide)methoxycarbonyl - L - α,γ - diaminobutyryl-D-leucyl - L - leucyl - Nγ - (3 - pyridyl - N - oxide)methoxycarbonyl - L - α,γ - diaminobutyryl - Nγ - (3-pyridyl-N - oxide)methoxycarbonyl - L - α,γ - diaminobutyryl - L - threonyl].

4. The cyclopeptide according to claim 1 which is cyclo[Nγ - L - α,γ - diaminobutyryl - Nγ - (3 - pyridyl-N-oxide)methoxycarbonyl - L - α,γ - diaminobutyryl - D-phenylalanyl - L - leucyl - Nγ - (3 - pyridyl - N - oxide)-methoxycarbonyl - L - α,γ - diaminobutyryl - Nγ - (3-pyridyl - N - oxide)methoxycarbonyl - L - α,γ-diaminobutyryl - L - threonyl].

5. The cyclopeptide according to claim 1 which is cyclo[Nγ - L - α,γ - diaminobutyryl - Nγ - (4 - pyridyl-N - oxide)methoxycarbonyl - L - α,γ - diaminobutyryl-D-leucyl - L - leucyl - Nγ - (4 - pyridyl - N - oxide)methoxycarbonyl - L - α, γ - diaminobutyryl - Nγ - (4 - pyridyl-N-oxide)methoxycarbonyl - L - α,γ - diaminobutyryl - L - threonyl].

References Cited

Suzuki et al.: J. Biochem. (Tokyo) 54, 412–418 (1963).
Suzuki et al.: J. Biochem. (Tokyo) 56, 182–189 (1964).
Suzuki et al.: J. Biochem. (Tokyo) 54, 555–556 (1963).
Wolman: The Chemistry of the Amino Group, Patai ed., Interscience Publishers, New York (1968), pp. 682–685.
Studer et al.: Helv. Chim. Acta 48, 1371–1378 (1965).

LEWIS GOTTS, Primary Examiner

R. J. SUYAT, Assistant Examiner

U.S. Cl. X.R.

195—29; 424—177

UNITED STATES PATENT OFFICE
CERTIFICATE OF CORRECTION

Patent No. 3,753,970    Dated August 21, 1973

Inventor(s) Jean BOUCHAUDON et al

It is certified that error appears in the above-identified patent and that said Letters Patent are hereby corrected as shown below:

The Claim for Priority is missing and should be inserted as follows:

--France, Appln. No. 69.26912 filed August 5, 1969. --

Signed and sealed this 2nd day of April 1974.

(SEAL)
Attest:

EDWARD M. FLETCHER, JR.
Attesting Officer

C. MARSHALL DANN
Commissioner of Patents